(12) United States Patent
Ouyang et al.

(10) Patent No.: US 9,170,375 B2
(45) Date of Patent: Oct. 27, 2015

(54) TM-POLARIZATION SPLITTER BASED ON PHOTONIC CRYSTAL WAVEGUIDE

(71) Applicant: SHENZHEN UNIVERSITY, Shenzhen, Guangdong (CN)

(72) Inventors: Zhengbiao Ouyang, Shenzhen (CN); Xin Jin, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 14/372,024

(22) PCT Filed: Jan. 9, 2013

(86) PCT No.: PCT/CN2013/070249
§ 371 (c)(1),
(2) Date: Jul. 14, 2014

(87) PCT Pub. No.: WO2013/104302
PCT Pub. Date: Jul. 18, 2013

(65) Prior Publication Data
US 2015/0049980 A1    Feb. 19, 2015

(30) Foreign Application Priority Data
Jan. 13, 2012  (CN) .......................... 2012 1 0064942

(51) Int. Cl.
G02B 6/00 (2006.01)
G02B 6/27 (2006.01)
G02B 6/10 (2006.01)
G02B 6/12 (2006.01)

(52) U.S. Cl.
CPC .............. *G02B 6/2773* (2013.01); *G02B 6/105* (2013.01); *G02B 2006/1213* (2013.01); *G02B 2006/1215* (2013.01)

(58) Field of Classification Search
CPC ................. G02B 6/2773; G02B 6/105; G02B 2006/1215
See application file for complete search history.

(56) References Cited

U.S. PATENT DOCUMENTS

| 7,783,139 B2 * | 8/2010 | Noda et al. ....................... 385/11 |
| 2009/0232441 A1 * | 9/2009 | Noda et al. ....................... 385/11 |

(Continued)

FOREIGN PATENT DOCUMENTS

| CN | 101126828 A | 2/2008 |
| CN | 101887145 A | 11/2010 |

(Continued)

OTHER PUBLICATIONS

International Search Report of PCT Patent Application No. PCT/CN2013/070249 issued on Apr. 25, 2013.

*Primary Examiner* — Rhonda Peace

(57) ABSTRACT

A photonic crystal waveguide TM-polarization splitter, comprising a photonic crystal waveguide with a completely forbidden band; after the input end (1) of the photonic crystal waveguide inputs an incident wave in any polarization direction into the polarization splitter, a TM wave is outputted from the output end (2) of the polarization splitter, and a TE wave is reflected back from the input end (1) of the polarization splitter. The TM-polarization splitter has a small size, high polarization, and high light transmission efficiency, facilitates integration and has high efficiency, is suitable for large scale optical path integration, and achieves the functions of polarizing and beam splitting for different wavelengths.

4 Claims, 4 Drawing Sheets

(56) References Cited

U.S. PATENT DOCUMENTS

2014/0355927 A1* 12/2014 Ouyang et al. .................. 385/11
2014/0355928 A1* 12/2014 Ouyang et al. .................. 385/11
2015/0049980 A1* 2/2015 Ouyang et al. .................. 385/11

FOREIGN PATENT DOCUMENTS

| | | |
|---|---|---|
| JP | 2001-174659 A | 6/2001 |
| JP | 2001-175659 A | 6/2001 |
| JP | 2004-125919 A | 4/2004 |

* cited by examiner

TM-POLARIZATION SPLITTER BASED ON PHOTONIC CRYSTAL WAVEGUIDE

FIELD OF THE INVENTION

The invention relates to the field of micro optical polarization beam splitter, in particular, to a tiny optical polarization beam splitter based on photonic crystal technology.

BACKGROUND OF THE INVENTION

Conventional polarization splitters are large in volume, and can not be used in the optical integrated circuits. However, micro optical devices including polarization splitters can be manufactured based on photonic crystals. Up to now, there are two methods, one of which is that a photonic crystal with a TE photonic bandgap and a TM transmission band, or a TM photonic bandgap and a TE transmission band are used to achieve the polarization separation of waves. This kind of polarization splitters can only be used as separate photonic crystal devices, since the transmittance and degree of polarization are poor, and it is difficult to integrate them into other photonic crystal devices. The other is that different relative coupling lengths are designed in order to couple light waves with different polarization states into different waveguides by means of long-distance coupling between waveguides, utilizing the method of periodic coupling and odd-even state alternation between the waveguides. The polarization splitters obtained by the two methods above, although the volume thereof has been much smaller than that of conventional polarization sputters, still have a relative large volume.

SUMMARY OF THE INVENTION

The object of the present invention is to overcome the shortcomings in the prior arts, and to provide a TM-polarization splitter based on a photonic crystal waveguide formed in a photonic crystal with a complete photonic bandgap, to be convenient for integration with high efficiency and a small dimension.

The object of the present invention is realized through the following technical schemes.

The TM-polarization splitter based on a photonic crystal waveguide according to the present invention includes a waveguide formed in a photonic crystal with a complete photonic bandgap, wherein after the incident wave with any polarization direction is inputted into the polarization splitter via the input port of the photonic crystal waveguide, TM wave is outputted from the output port of the polarization splitter, while the TE wave is reflected from the input port of the polarization splitter.

Dielectric defect rods are arranged in the photonic crystal waveguide, the refractive index for the e-light is more than that for the o-light in the dielectric defect rods in the waveguide, and the direction of the optical axis of the dielectric defect rods in the waveguide is consistent with that of the background dielectric rods.

The number of the dielectric defect rods in the waveguide is 1 or 2 or 3 or 4 or 5 or 6.

The photonic crystal waveguide is a two-dimensional photonic crystal waveguide, and includes a two-dimensional photonic crystal waveguide with tellurium dielectric material, a two-dimensional photonic crystal waveguide with honeycomb structure, a two-dimensional photonic crystal waveguide with triangular lattice, and two-dimensional photonic crystal waveguides with various irregular shapes.

The photonic crystal waveguide has a structure formed by removing 1 or 2 or 3 or 4 rows of the dielectric rods from the photonic crystal.

Compared with the prior arts, the present invention has the following advantages:

(1) The structure has the advantages of small volume, high degree of polarization, high light transmission efficiency, and being suitable for large-scale optical integrated circuits;

(2) The present invention can completely realize the polarization separation function via a kind of dielectric defect rods in a small volume, thus it is convenient for optical integration and high efficient;

(3) The present invention can realize the polarization beam splitting function for different wavelengths by be method of scaling the lattice constant and other geometric parameters utilizing the scaling property of photonic crystals.

The initial signal for the present device is inputted from the left port "1", the port "2" outputs TM light wave. "3" is the background tellurium dielectric rods, the direction of the optical axis thereof is outwards vertical to the paper plane, and the radius thereof is R=0.3568a, "4" is round dielectric defect rods, the direction of the optical axis thereof is consistent with that of the background dielectric rods, the radius thereof is R=0.175a, and the position center thereof is consistent with the respective circle center of the background dielectric rods deleted.

Figure 2:
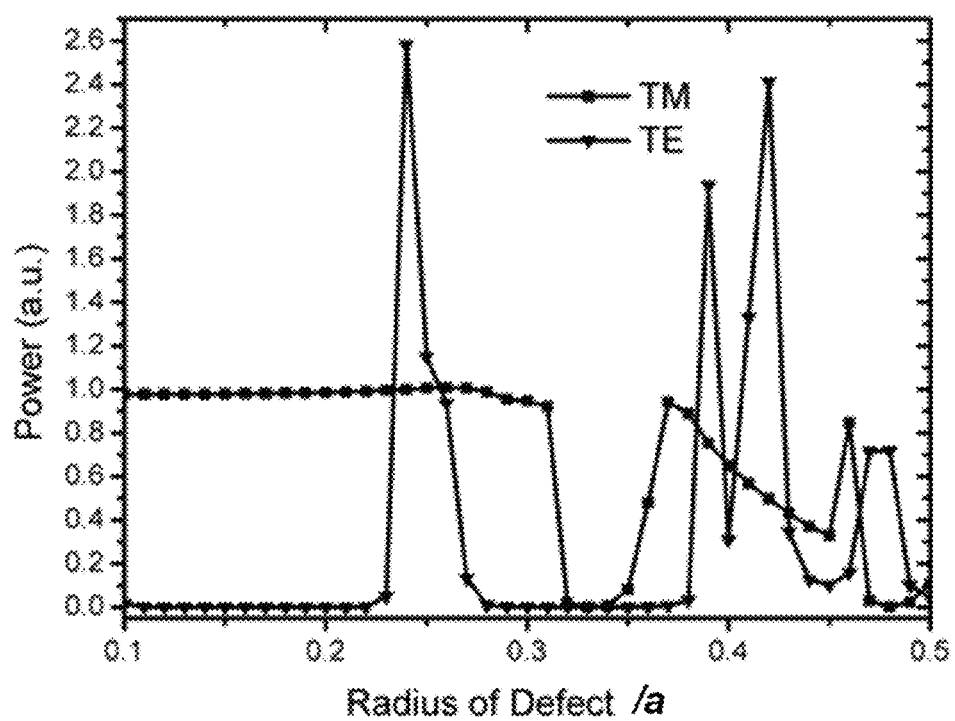

FIG. 2 is the power of TM and TE waves in the TM output channel versus the radius of the dielectric defect rods in the waveguide of the TM-polarization splitter according to the present invention.

Figure 3:
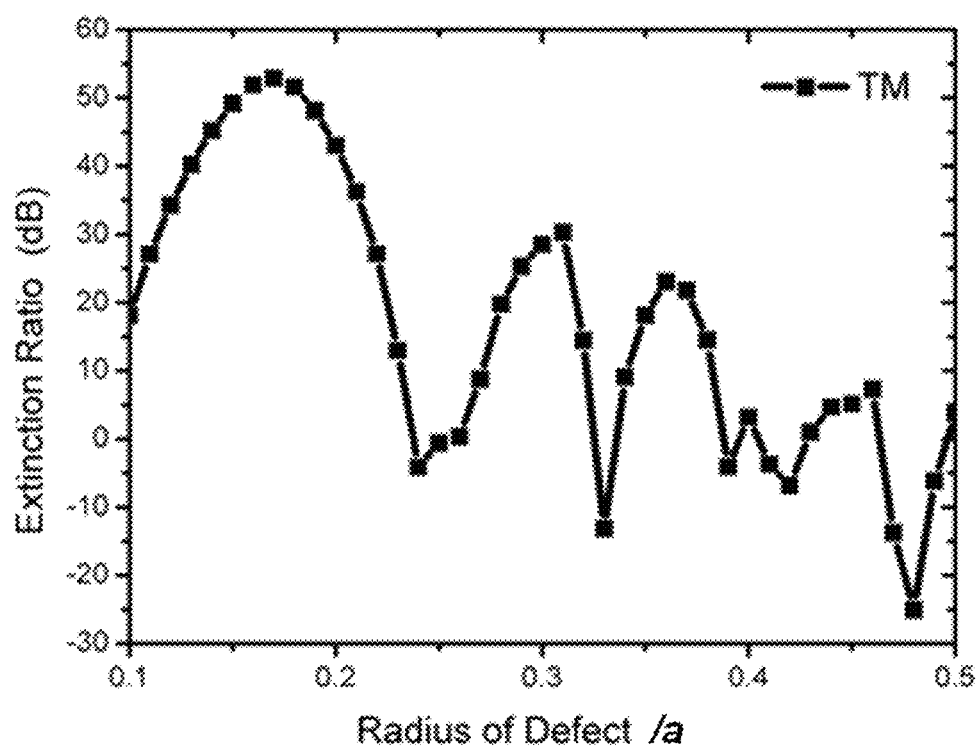

FIG. 3 is the extinction ratio of light in the TM output channel versus the radius of the dielectric defect rods in the waveguide of the TM-polarization splitter according to the present invention.

Figure 4:
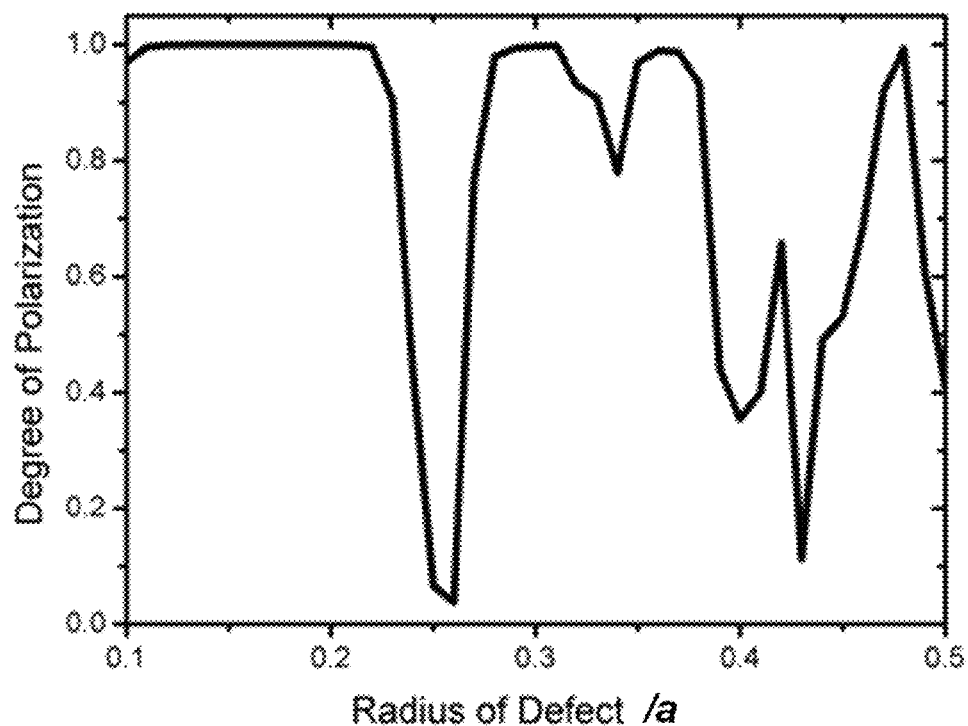

FIG. 4 is the degree of polarization of light in the TM output channel versus the radius of the round dielectric defect rods in the waveguide of the TM-polarization splitter according to the present invention.

Figure 5:
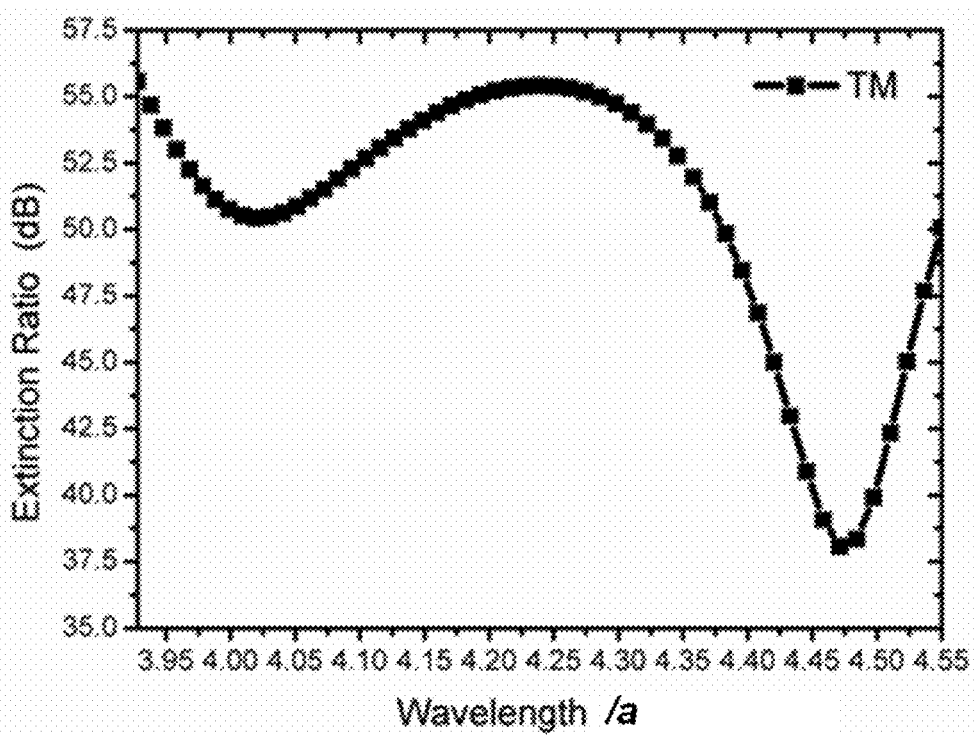

FIG. 5 is the extinction ratio of light versus wavelength in the TM output channel in the photonic bandgap region of the photonic crystal in the TM-polarization splitter according to the present invention.

Figure 6:
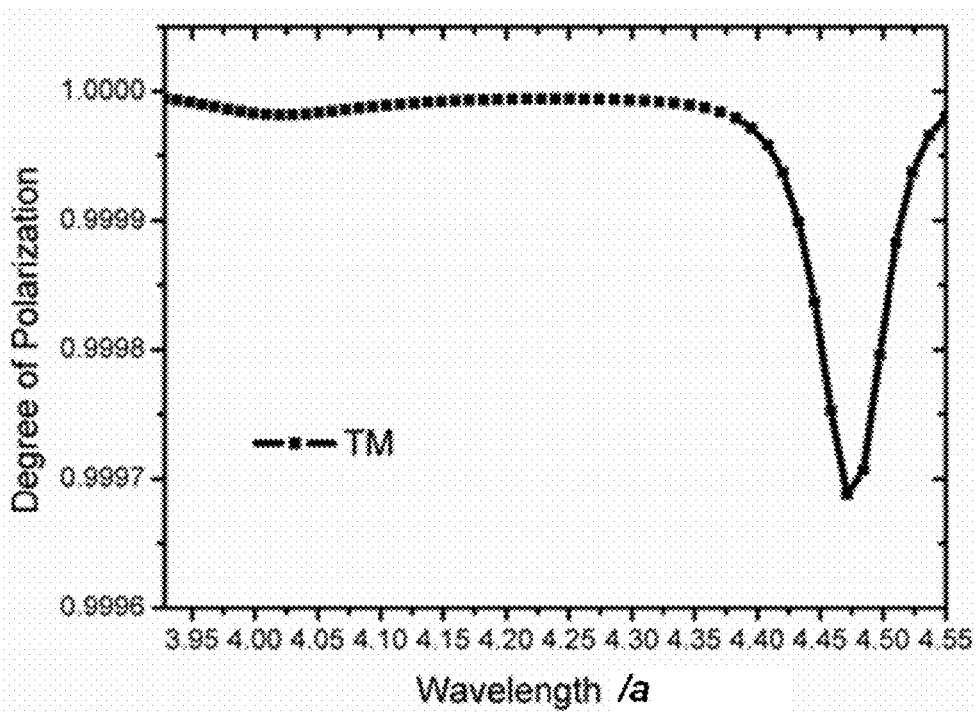

FIG. 6 is the degree of polarization of light versus wavelength in the TM output channel in the photonic bandgap region of the photonic crystal in the TM-polarization splitter according to the present invention.

Figure 7:
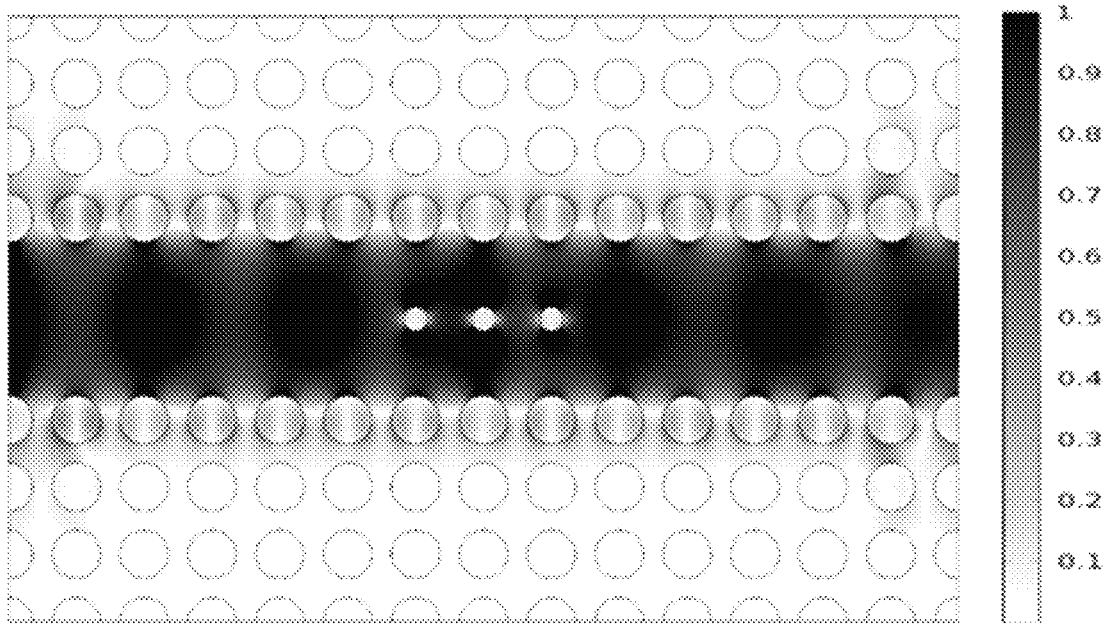

FIG. 7 is the simulated field distribution for TM waves.

Figure 8:
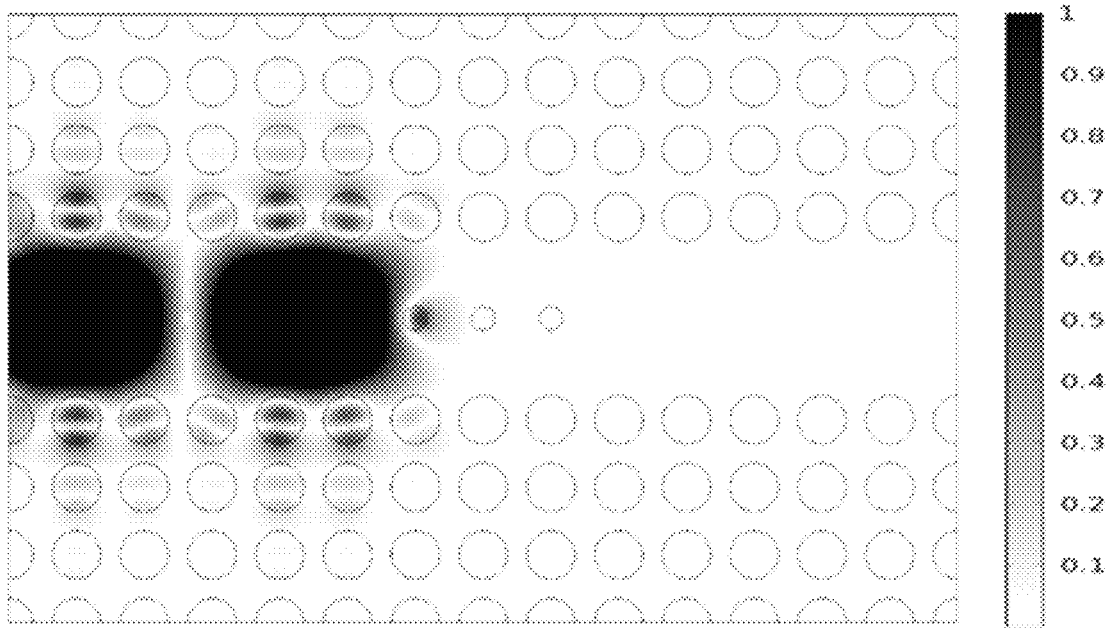

FIG. 8 is the simulated field distribution for TE waves.

DETAILED DESCRIPTION OF THE PREFERRED EMBODIMENTS

Below in connection with the accompanying drawings and specific embodiments, the present invention will be described in further detail.

The dielectric material in the principle introduction and the embodiments of the present invention is Te dielectric rod as an example. In the present invention, both TE and TM lights can propagate in a fundamental mode in the waveguide formed by arranging an array—a photonic crystal—of uniaxial positive crystal tellurium in a square lattice on a substrate and deleting two lines or two rows at the center of the photonic crystal. The e-light optical axis of each tellurium dielectric rod in said array must satisfy that it is consistent with the direction of the axis of the cylinder. The operating wavelength can be adjusted by the lattice constant of the photonic crystal. But the selection of the operating wavelength can not exceed a stable linear range of the refractive index.

Figure 1:
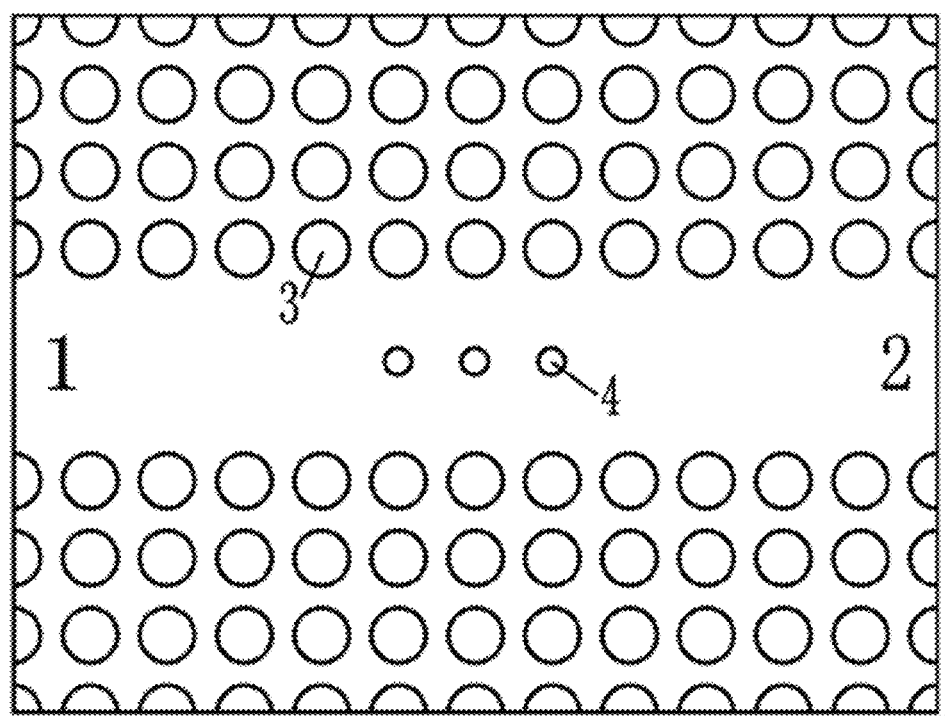
FIG. 1 is the schematic diagram, showing the structure of a Tellurium photonic crystal waveguide device used in the present invention.

As shown in FIG. 1, two lines or two rows of dielectric rods in the photonic crystal in the present invention needs to be deleted to form the waveguide for guiding light, and the width thereof is L=3a, which is the distance between the circle centers of nearest background dielectric rods on the two walls of the waveguide, wherein a is the lattice constant of the photonic crystal. The radius of the background tellurium dielectric rods in the photonic crystal is R=0.3568a. Cartesian rectangular coordinate system is used in the description, wherein the positive direction of X axis is to the right horizontally in the paper plane; the positive direction of Y axis is vertically upward in the paper plane; and the positive direction of Z axis is outward vertically to the paper plane.

The equivalent refractive indexes of the defect rods are:

$$n_{eff}^{TE} = \sqrt{\varepsilon_{eff}^{TE}}, \varepsilon_{eff}^{TE} = \frac{\int_\Omega \varepsilon_e \cdot E_z^2 \, d\Omega}{\int_\Omega E_z^2 \, d\Omega}, \varepsilon_e = n_e^2, \tag{1}$$

$$n_{eff}^{TM} = \sqrt{\varepsilon_{eff}^{TM}}, \varepsilon_{eff}^{TM} = \frac{\int_\Omega \varepsilon_o \cdot (E_x^2 + E_y^2) \, d\Omega}{\int_\Omega (E_x^2 + E_y^2) \, d\Omega}, \varepsilon_o = n_o^2, \tag{2}$$

In the equation, $n_{eff}^{TE}$ and $n_{eff}^{TM}$ represent the equivalent refractive indexes for TE and TM lights, respectively, and $E_x$, $E_y$ and $E_z$ are the x, y, z components of the electric field, respectively.

The reflection ratio (R) and the transmissivity (T) of the light wave in the waveguide due to the defect rods can be expressed as:

$$R_{TE} = \left(\frac{n_{eff}^{TE} - 1}{n_{eff}^{TE} + 1}\right)^2, \tag{3}$$

$$T_{TE} = \frac{4n_{eff}^{TE}}{(n_{eff}^{TE} + 1)^2},$$

$$R_{TM} = \left(\frac{n_{eff}^{TM} - 1}{n_{eff}^{TM} + 1}\right)^2, \tag{4}$$

$$T_{TM} = \frac{4n_{eff}^{TM}}{(n_{eff}^{TM} + 1)^2},$$

FIG. 2 shows the output power of different TE and TM light waves versus the radius of the three round dielectric defect rods. It can be seen from FIG. 2 that for the radius in the range of 0.1a-0.22a, TM wave has a maximum of output power.

As shown in FIGS. 3 and 4, by simultaneously adjusting the radius of the three dielectric defect rods, we can have $R_{TM} \approx 0$, $T_{TM} \approx 1$ and $R_{TE} \approx 0$, i.e., the function of isolating TE light and transmitting TM light is realized. (Here, the direction of the e-axis of the dielectric defect rods is consistent with that of the background tellurium dielectric rods in the photonic crystal.)

According to FIG. 3, for the radius of the three round dielectric defect rods in the range of 0.1a-0.227a, the TM wave has a maximum extinction ratio of not less than 18 dB. According to FIG. 4, for the radius of the three round dielectric defect rods in the range of 0.1a-0.227a, the TM wave has the degree of polarization larger than 0.995. By considering FIGS. 3 and 4 together, it can be derived that for TM wave having both maximum extinction ratio and high degree of polarization, the radius of the round dielectric rod is $$R_{defect} = 0.175a \tag{1}$$

In this case, we have $n_{eff}^{TM} \rightarrow 1$, $n_{eff}^{TE} \rightarrow \infty$.

As shown in FIG. 1, in the three round dielectric defect rods, the center of each round dielectric defect rod is consistent with the center of the background round dielectric rod which was originally deleted in forming the waveguide, therefore, the distance between any two adjacent round dielectric defect rods is a, the distance between the center of the round dielectric defect rod and that of the nearest background dielectric rod is also a, and each radius of the round dielectric defect rods is 0.175a. The direction of the optical axis of the three round tellurium dielectric defect rods is consistent with that of the background cylinder tellurium dielectric rods in the photonic crystal.

For the waveguide with the above defects introduced, the incident signal port is at the position "1" in FIG. 1. Light is propagated in the waveguide formed by the array of "3" dielectric rods, after the light arrives at the defect position "4", the TM wave in the light is totally transmitted, and the TE wave in the light is totally isolated. After the signal acted with the defect rods, the TM wave will be finally outputted at the position "2" of the output port. For different input signals, the selection functions ace provided as follows:

(1) For the incident light of mixed TE and TM waves, the TM wave is totally exported from the right-hand side of the waveguide, and the TE wave is totally isolated.

(2) For the incident light of only TM wave, the TM wave is exported from the right-hand side of the waveguide, (3) For the incident light of only TE wave, the TE wave can't be brought into the right-hand side of the waveguide.

The lattice constant and the operating wavelength can be determined by the following ways. According to the refractive index curve of the uniaxial crystal tellurium, tellurium has a relative stable refractive index in the wavelength range between 3.5a~35a. By the equation $$f = \frac{\omega a}{2\pi c} = \frac{a}{\lambda}, \tag{6}$$

wherein f is the photonic bandgap frequency, and the normalized photonic bandgap frequency range of the square lattice tellurium photonic crystal in the present invention $$f = 0.21977 \rightarrow 0.25458, \tag{7}$$

the corresponding photonic band gap wavelength range is calculated as:

$$\lambda = 3.928a\sim4.55a. \tag{8}$$

Thus, it can be seen that, by varying the value of the lattice constant a, the required wavelength λ proportional to the lattice constant can be acquired.

The extinction ratio in the waveguide is defined as:

$$\text{Extinction Ratio}_{TE} = 10 \times \log_{10}\left(\frac{I_{TE}}{I_{TM}}\right), \text{ for } TE \text{ wave}, \tag{9}$$

-continued $$\text{Extinction Ratio}_{TM} = 10 \times log_{10}\left(\frac{I_{TM}}{I_{TE}}\right), \text{ for } TM \text{ wave.} \quad (10)$$

The degree of polarization is defined as:

$$\text{Degree of Polarization}_{TE} = \left|\frac{I_{TE} - I_{TM}}{I_{TE} + I_{TM}}\right|, \text{ for } TE \text{ wave,} \quad (11)$$

$$\text{Degree of Polarization}_{TM} = \left|\frac{I_{TM} - I_{TE}}{I_{TM} + I_{TE}}\right|, \text{ for } TM \text{ wave.} \quad (12)$$

From FIG. 5, it can be found that for the operating wavelength in 3.928a-4.55a, all of the extinction ratios for TM wave at the output port are larger than 38 dB, i.e., in the entire photonic bandgap, extremely high extinction ratio is provided.

From FIG. 6, it can be found that for the operating wavelength in 3,928a-4.55a, all of the degree of polarizations for TM wave at the output port are larger than 0.9996, i.e., in the entire photonic bandgap, extremely good degree of polarization is provided.

By considering FIGS. 5 and 6 together with the above analysis, it can be found that the TM polarization splitter function of the present invention can be realized very well using all the light waves in the wavelength band of 3.928a-4.55a, which shows that the present invention has a large operating wavelength range, which is not available for other polarization beam splitting devices based on coupling of cavity modes.

FIGS. 7 and 8 are the light field diagrams calculated by finite element software COMSOL for the operating wavelength of 4.1a in free space. It can be observed that the TM light propagates with a high transmittance while the TE light is entirely isolated, so it has an extremely high extinction ratio.

The present invention has a high extinction ratio and meanwhile has a broad operating wavelength range, which allows the pulses with a certain frequency spectrum width, or Gauss-pulse light, or light with different wavelengths, or light with multiple wavelengths to operate at the same time, and is useful in practice.

The above embodiment and application range of the present invention can be improved, and should not be understood as the limit of the invention.

What is claimed is:

1. A TM-polarization splitter based on a photonic crystal waveguide, comprising a waveguide formed in a photonic crystal with a complete photonic bandgap, after the incident wave with any polarization direction is inputted into the polarization splitter via the input port of the photonic crystal waveguide, TM wave is outputted from the output port of the polarization splitter, while the TE wave is reflected from the input port of the polarization splitter, wherein said photonic crystal waveguide is provided with the waveguide-defect dielectric rods, and the defect dielectric rods are three circular shaped defect dielectric rods, in which the center of each circular shaped dielectric rod coincides with the center of circular shaped dielectric rod which was originally deleted in forming the waveguide.

2. The TM-polarization splitter based on a photonic crystal waveguide according to claim 1, wherein the refractive index for the e-light is more than that for the o-light in the dielectric defect rods in waveguide, and the direction of the optical axis of the dielectric defect rods in waveguide is consistent with that of the background dielectric rods.

3. The TM-polarization splitter based on a photonic crystal waveguide according to claim 1, wherein the photonic crystal waveguide is a two-dimensional photonic crystal waveguide, and includes a two-dimensional photonic crystal waveguide with tellurium dielectric material, a two-dimensional photonic crystal waveguide with honeycomb structure, a two-dimensional photonic crystal waveguide with triangular lattice, or two-dimensional photonic crystal waveguides with various irregular shapes.

4. The TM-polarization splitter based on a photonic crystal waveguide according to claim 1, wherein the photonic crystal waveguide has a structure formed by removing 1 or 2 or 3 or 4 rows of the dielectric rods from the photonic crystal.

* * * * *